(12) United States Patent
Wahlers-Schmidlin et al.

(10) Patent No.: US 9,252,583 B2
(45) Date of Patent: Feb. 2, 2016

(54) METHOD OF WRAPPING ELONGATE MATERIAL, ESPECIALLY CABLE HARNESSES, WITH A SHEATH

(75) Inventors: Andreas Wahlers-Schmidlin, Horneburg (DE); Thomas Friedrich, Uetersen (DE); Frank Lange, Hamburg (DE)

(73) Assignee: tesa SE, Nordestedt (DE)

( * ) Notice: Subject to any disclaimer, the term of this patent is extended or adjusted under 35 U.S.C. 154(b) by 2021 days.

(21) Appl. No.: 11/503,843

(22) Filed: Aug. 14, 2006

(65) Prior Publication Data

US 2007/0071976 A1    Mar. 29, 2007

Related U.S. Application Data

(62) Division of application No. 11/158,791, filed on Jun. 22, 2005, now Pat. No. 7,132,028.

(30) Foreign Application Priority Data

Apr. 14, 2005    (DE) .......................... 10 2005 017 381

(51) Int. Cl.
*D02G 3/00* (2006.01)
*H02G 11/00* (2006.01)
*H02G 3/04* (2006.01)

(52) U.S. Cl.
CPC ............. *H02G 11/00* (2013.01); *H02G 3/0481* (2013.01); *Y10T 428/2933* (2015.01); *Y10T 442/2738* (2015.04); *Y10T 442/2746* (2015.04); *Y10T 442/2754* (2015.04)

(58) Field of Classification Search
CPC ............. C09J 2201/28; C09J 2203/302; C09J 2400/263; C09J 7/04; Y10T 442/2738; Y10T 442/2746; Y10T 442/2754

USPC .......... 442/149–151; 428/93, 189, 195.1, 343
See application file for complete search history.

(56) References Cited

U.S. PATENT DOCUMENTS

| | | | |
|---|---|---|---|
| 351,191 A | 10/1886 | McCracken | |
| 3,488,537 A | 1/1970 | Beddows | |
| 4,327,246 A | 4/1982 | Kincaid | |
| 4,900,879 A | 2/1990 | Buck et al. | |
| 5,132,491 A | 7/1992 | Mulrooney et al. | |
| 5,367,123 A * | 11/1994 | Plummer et al. | ................. 174/36 |

(Continued)

FOREIGN PATENT DOCUMENTS

| | | |
|---|---|---|
| DE | 20 52 271 | 10/1970 |
| DE | 24 32 769 A1 | 1/1976 |

(Continued)

*Primary Examiner* — Elizabeth M Cole
(74) *Attorney, Agent, or Firm* — Norris McLaughlin & Marcus, P.A.

(57) ABSTRACT

A method of wrapping elongate material with a sheath having first and second single-sided adhesive tapes the tapes laminated to one another with an offset, a free edge of the first adhesive tape aligned parallel to the center axis such that, relative to the center axis of the material, the adhesive of the first adhesive tape lies outwards, the first adhesive tape of the sheath guided by the free edge onto the material, and wound around the material so that the first adhesive tape essentially completely envelopes the material, the second adhesive tape also wound around the material, the exposed adhesive of the second adhesive tape bonding to the exposed adhesive of the first adhesive tape, so that the material is surrounded by at least two plies of adhesive tape.

17 Claims, 4 Drawing Sheets

(56) References Cited

U.S. PATENT DOCUMENTS

| | | |
|---|---|---|
| 2003/0198806 A1* | 10/2003 | Samson-Himmelstjerna et al. .................... 428/343 |
| 2004/0082243 A1 | 4/2004 | Kulper |
| 2005/0031821 A1 | 2/2005 | Clark |
| 2005/0069666 A1 | 3/2005 | Ferrand |

FOREIGN PATENT DOCUMENTS

| | | |
|---|---|---|
| DE | 44 42 092 C2 | 5/1996 |
| DE | 44 42 093 C2 | 5/1996 |
| DE | 44 42 507 C2 | 6/1996 |
| DE | 299 00 294 U1 | 4/1999 |
| DE | 198 07 752 A1 | 8/1999 |
| DE | 199 10 730 A1 | 10/1999 |
| DE | 299 16 616 U1 | 1/2000 |
| DE | 100 36 805 A1 | 2/2002 |
| DE | 100 11 788 A1 | 3/2002 |
| DE | 100 29 983 A1 | 3/2002 |
| DE | 100 39 983 A1 | 3/2002 |
| DE | 100 42 732 A1 | 3/2002 |
| DE | 100 54 909 A1 | 7/2002 |
| DE | 101 02 927 A1 | 7/2002 |
| DE | 101 13 425 A1 | 10/2002 |
| EP | 0 071 212 B1 | 2/1983 |
| EP | 0 886 357 A2 | 12/1998 |
| EP | 0 886 358 A2 | 12/1998 |
| EP | 0 955 783 A2 | 4/2000 |
| EP | 0 995 782 A2 | 4/2000 |
| EP | 1 063 747 A1 | 12/2000 |
| JP | 2001 67955 A | 3/2001 |
| WO | WO 00/13894 | 3/2000 |

* cited by examiner

METHOD OF WRAPPING ELONGATE MATERIAL, ESPECIALLY CABLE HARNESSES, WITH A SHEATH

This application is a division of U.S. Ser. No. 11/158,791 filed on Jun. 22, 2005, now U.S. Pat. No. 7,132,028.

The invention relates to a method of wrapping elongate material, especially cable harnesses, with a sheath, the bandaged cable looms being useful in automobiles.

In many segments of industry, bundles composed of a multiplicity of electrical lines are wrapped either before installation or when already mounted, in order to reduce the space taken up by the bundle of lines, by means of bandaging, and additionally to obtain protective functions. With sheet adhesive tapes a certain protection against ingress of liquid is achieved; with airy and bulky adhesive tapes based on thick nonwovens or foam backings, insulating properties are obtained; and, when stable, abrasion-resistant backing materials are used, a protective function is achieved against scuffing and rubbing.

Particularly the protective function with respect to scuffing, rubbing, grinding on sharp edges and burrs, summarized here under the rubric of abrasion resistance, is increasing in significance. The sharp edges, burrs and weld points that come about as a result of production operations are increasingly not having their sharpness removed by complicated post-production work, since such work entails an additional operation and increased costs. This is so in particular in the case of the untreated bodies in the automobile industry, but also in other segments too, such as in the case of washing machines, vibrating machines such as compressors and the like, for example. Cable strands which run in such segments and which are scuffed by vibration, relative movements and the like on such sharp points are therefore at potential risk of destruction of the protective sheath. This protective sheath may be the additional wound bandaging, or else may be the insulation around the copper cable itself. In that case the result would be a short circuit with complete functional failure and destruction of electrical/electronic components, possibly going as far as a fire, with the attendant risks of damage to equipment and people.

In order to minimize potential hazards of this kind it is the case not only that normal wrapping tapes are used to bandage the cable strands at critical points but also that additional precautions are taken. Either specialty adhesive tapes are used or particular protective components are employed. These components may be, for example, cable ducts made of wear-resistant polymers such as nylon or fluted tubes or braided hoses of polyester or nylon, all components which are unfavorable from the standpoints of cost, separate logistics, and complexity of handling during assembly. In the case of the assembly of fluted tubes and cable ducts, for example, considerable effort is required for attaching the lengthy tube systems and fixing them reliably to the cable bundle and/or to the body, in order to prevent slipping. Additionally, separate measures may be necessary for preventing rattling, since the lines in the tube systems rarely lie flush against them and in the event of vibrations they therefore produce rattling noises with the hard materials of the tubes.

Specialty adhesive tapes as well are used in segments involving increased abrasion protection and scuff protection. Adhesive tapes for the wrapping of cable harnesses or similar elongate systems with additional functionalities are known prior art and in some cases are also utilized commercially:

Sound insulation is the purpose of the adhesive tape described in DE 199 10 730 A1, which is composed of a laminate, a sound insulation layer (velour or foam) and a web, produced using hotmelt adhesive, melting powder or a transfer fixative. The use of the very expensive velour backing comprising the polymer material polyester or polyamide is also employed in other patent applications which describe adhesive tapes having a pronounced antirattle function (DE 299 00 294 U1, DE 299 16 616 U1, and DE 101 02 927 A1). In all cases the resulting adhesive tapes are highly priced and in terms of abrasion protection do not meet very exacting requirements.

WO00/13894 A1 describes a scuff protection device as edge protection for sharp-edged components such as sheet steel bodywork burrs, the scuff protection being adhered in such a manner as to engage around such areas. The scuff protection is composed of a textile backing layer (made of velour or a needlefelt, for example) and of a protective film, preferably made of thermoplastic polyurethane polymer, which is applied on the side of the scuffing sites, and also of an adhesive layer which is applied on the side of the component and has a release paper lining. Textile backing layer and protective film are joined to one another via a thin adhesive bond, the adhesive being applied only in selected areas in the form of a heat-activatable adhesive web, powder or film. This complicated assembly is lined with released paper, used in appropriate cut-to-size shapes, and is therefore unsuitable for the general protective wrapping of cable looms. The protective device of this invention does not actively protect the cable loom; instead, where needed, sharp-edged parts are locally masked from their surroundings as a kind of passive cable-harness protection.

DE 100 42 732 A1 describes an adhesive tape for the spiral wrapping of elongate materials such as cable harnesses, for example, where a stripe coating which does not extend over the full area of the backing, preferably a textile backing, produces reduced adhesion of the wrapping tape to the lines and hence improved mobility and bendability of the cable harness as a whole. Inventive adhesive tapes of that kind, however, do not offer any particular abrasion protection, but serve solely for the flexibilization of the cable harness.

An adhesive tape with a combination of noise reduction and frictional-stress protection properties is described in DE 101 13 425 A1. Even at the required basis mass of the web backing, with vertical pile folds, of more than 200 g/m$^2$, the protective effects obtained are only in the middle range for attenuation, and in particular against abrasion, as was already known from EP 0 995 782 A1 and also EP 0 995 783 A1. Similar considerations also apply to DE 100 39 983 A1, which in one specific embodiment describes a textile assembly composed of a scuff-resistant web and a textile sheetlike structure, which is produced without the use of a laminating adhesive or the like, solely by hydroentanglement. While the textile sheetlike structure imparts additional attenuation or reinforcing properties to the assembly, the abrasion resistances for the scuff-resistant hydroentangled base web, composed of stable fibers, is seen as being fairly low for a basis mass of not more than 200 g/m$^2$.

Besides the stitchbonded web mentioned in the cited publication, there are further backings which are used in adhesive tapes for cable loom bandaging.

DE 44 42 092 C1 describes one such stitchbond-based adhesive tape, which is coated on the reverse of the backing. DE 44 42 093 C1 is based on the use of a web as backing for an adhesive tape, the web being formed by the formation of loops from the fibers of the web to produce a reinforced cross-layed fiber web, in other words a web which is known to the skilled worker under the name Malifleece. DE 44 42 507 C1 discloses an adhesive tape for cable bandaging, but bases it on so-called Kunit or Multiknit webs.

Likewise a multilayer backing assembly is described in EP 1 063 747 A1, with the aim of using it to form a protective wrapping for elongate articles with good abrasion resistance and soundproofing. In accordance with that invention it is necessary, for the assembly backing, to take at least two webs, which are bonded to one another loosely, mostly only in selected areas, and which are able to move relative to one another. Wovens, formed-loop knits and similar textile backings are explicitly ruled out as being unsuitable. The extent of the abrasion resistance and the soundproofing of inventive multilayer systems also remains unclear, since no specific, measured data are communicated.

An extremely complicated and high-cost multilayer assembly is disclosed by EP 0 886 357 A1 and EP 0 886 358 A1. In this case a spunbonded PET web, a formed-loop PET knit and also, where appropriate, a felt ply or foam ply are each bonded to a laminating layer. This assembly of up to five plies, which is already complicated, is additionally provided partially with the two necessary components of a touch-close fastening system and with one or more self-adhesive strips lined with protective paper. From an economic standpoint, systems of this kind with a high abrasion protection function are practicable only at a few, selected sites, but not as general wrapping tapes for cable harnesses or other elongate articles.

DE 100 36 805 A1 describes a wrap for wrapping elongate material, especially cable harnesses, with a preferably textile enclosure, wherein on at least one edge region of the enclosure, said region being narrow in comparison to the width of the enclosure, there is a self-adhesive tape which is bonded to the enclosure in such a way that the adhesive tape extends over one of the longitudinal edges of the enclosure.

It is an object of the invention to achieve a marked improvement over the state of the art and to provide a method of wrapping that combines the facility to bandage individual lines to form cable harnesses with a high level of protection against mechanical damage by scuffing and rubbing on sharp edges, burrs, and weld points.

This object is achieved by means of a method as described hereinbelow.

The invention accordingly provides a method of wrapping elongate material, especially cable harnesses, with a sheath comprising a first and a second single-sidedly adhesive tape the tapes in the running direction each being laminated to one another on the adhesive side with an offset, the free edge of the first adhesive tape of the sheath being aligned parallel to the center axis such that, relative to the center axis of the material, the adhesive of the first adhesive tape lies outwards.

The first adhesive tape of the sheath is guided by the free edge onto the material.

The first adhesive tape of the sheath is wound around the material so that the first adhesive tape of the sheath essentially completely envelops the material.

The second adhesive tape of the sheath is guided in a further winding around the material, the exposed adhesive of the second adhesive tape bonding to the exposed adhesive of the first adhesive tape, so that the material is always surrounded by at least two plies of adhesive tape.

In one advantageous embodiment of the invention the winding of the second adhesive tape of the sheath is such that the exposed adhesive of the first adhesive tape is completely covered by the second adhesive tape.

In a further advantageous embodiment of the invention, at the free edge of the first adhesive tape of the sheath, a third single-sidedly adhesive tape is laminated onto the first adhesive tape in the running direction, in each case on the adhesive side, with an offset, the third adhesive tape having a narrower width than the first.

The third adhesive tape serves as an application aid for the sheath on the material and so facilitates handling.

In a further advantageous embodiment of the invention the sheath and also the sheath with the third adhesive tape are present in fixed lengths, for example as meter product, or as continuous product on rolls (Archimedean spiral).

The sheath preferably has a width of 50 to 400 mm, in particular of 80 to 280 mm.

With further preference the first adhesive tape has a width of 40 to 140 mm, the second adhesive tape a width of 40 to 140 mm and/or the third adhesive tape a width of 20 to 40 mm.

With further preference the first adhesive tape is laminated onto the second adhesive tape with an offset of 5% to 20% relative to the width of the adhesive tape.

With further preference the third adhesive tape is laminated onto the first adhesive tape with an offset of 40% to 60%, in particular 50%, relative to the width of the adhesive tape.

In a further advantageous embodiment of the invention the sheath has one or more lines of weakness essentially at right angles to the running direction.

In order further to improve hand tearability, in one preferred embodiment of the invention the lines of weakness extend over the entire width of the sheath: that is, of the first adhesive tape, of the second adhesive tape and/or of the third adhesive tape.

In order to allow a particularly simple operation for the user, the lines of weakness are aligned at right angles to the running direction of the sheath and/or are disposed at regular intervals.

The sheath is particularly easy to sever if the lines of weakness are configured in the form of perforations.

In this way it is possible to achieve edges between the individual sections which are highly fluff-free, and so unwanted fraying is prevented.

With particular advantage the lines of weakness can be produced either discontinuously, using flat dies or cross-running perforating wheels or continuously using rotary systems such as spike rollers or punch rollers, with or without the use of a counter-roller (Vulkollan roller), which form the counter wheel when slitting.

Further possibilities include slitting technologies which are controlled to operate intermittently, such as, for example, the use of lasers, ultrasound, high-pressure water jets, etc. Where, in the case of laser slitting or ultrasonic slitting, some of the energy is introduced as heat into the backing material, the fibers can be melted in the region of slitting, thereby very largely preventing disruptive fraying, and giving sharply contoured slit edges. Latter methods are also suitable for obtaining specific slit-edge geometries: for example, concave or convex slit edges.

The height of the spikes or blades on the punch rollers is preferably 150% of the sum of the thickness of the first adhesive tape plus the thickness of the second or third adhesive tape.

The hole-to-bridge ratio in the case of perforation—that is, the ratio of the number of millimeters where the material is severed to the number of millimeters where the material holds together ("bridge")—determines how easy it is to tear, in particular, the fibers of the backing material. This ratio also has an ultimate effect on the extent to which the torn edge is fluff-free.

The bridge width is preferably approximately 2 mm and the slit width between the bridges is approximately 10 mm; in other words, bridges 2 mm wide alternate with incisions 10 mm long. The hole-to-bridge ratio, accordingly, is preferably 2:10.

With this weakening of the material it is possible to obtain a sufficiently low tear force.

The backing material of the first, second and/or third adhesive tape is composed preferably of a loop product or of a velour, lay, woven or formed-loop knit, in particular a PET filament woven or a nylon woven.

As backing material for the adhesive tapes it is possible additionally to use all known textile backings such as wovens, knits or nonwoven webs; the term "web" embraces at least textile sheetlike structures in accordance with EN 29092 (1988) and also stitchbonded nonwovens and similar systems.

It is likewise possible to use spacer fabrics, including wovens and knits, with lamination. Spacer fabrics of this kind are disclosed in EP 0 071 212 B1. Spacer fabrics are matlike layer structures comprising a cover layer of a fiber or filament fleece, an underlayer and individual retaining fibers or bundles of such fibers between these layers, said fibers being distributed over the area of the layer structure, being needled through the particle layer, and joining the cover layer and the underlayer to one another. As an additional though not mandatory feature, the retaining fibers, in accordance with EP 0 071 212 B1, comprise inert mineral particles, such as sand, gravel or the like, for example.

The holding fibers needled through the particle layer hold the cover layer and the underlayer at a distance from one another and are joined to the cover layer and the underlayer.

Spacer wovens or spacer knits are described, inter alia, in two articles, namely an article from the journal kettenwirk-praxis 3/93, 1993, pages 59 to 63, "Raschelgewirkte Abstandsgewirke" [Raschel-knitted spacer knits]
and
an article from the journal kettenwirk-praxis 1/94, 1994, pages 73 to 76, "Raschelgewirkte Abstandsgewirke", the content of said articles being included here by reference and being part of this disclosure and invention.

Suitable nonwovens include, in particular, consolidated staple fiber webs, but also filament webs, meltblown webs, and spunbonded webs, which generally require additional consolidation. Known consolidation methods for webs are mechanical, thermal, and chemical consolidation. Whereas with mechanical consolidations the fibers are mostly held together purely mechanically by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to the fiber nodal points, so that a stable, three-dimensional network is formed while retaining the loose open structure in the web.

Webs which have proven particularly advantageous are those consolidated in particular by overstitching with separate threads or by interlooping.

Consolidated webs of this kind are produced, for example, on stitchbonding machines of the "Malifleece" type from the company Karl Mayer, formerly Malimo, and can be obtained, inter alia, from the companies Naue Fasertechnik and Techtex GmbH. A Malifleece is characterized in that a cross-laid web is consolidated by the formation of loops from fibers of the web.

The backing used may also be a web of the Kunit or Multiknit type. A Kunit web is characterized in that it originates from the processing of a longitudinally oriented fiber web to form a sheetlike structure which has the heads and legs of loops on one side and, on the other, loop feet or pile fiber folds, but possesses neither threads nor prefabricated sheet-like structures. A web of this kind has been produced, inter alia, for many years, for example on stitchbonding machines of the "Kunitvlies" type from the company Karl Mayer. A further characterizing feature of this web is that, as a longitudinal-fiber web, it is able to absorb high tensile forces in the longitudinal direction. The characteristic feature of a Multi-knit web relative to the Kunit is that the web is consolidated on both the top and bottom sides by virtue of the double-sided needle punching.

Finally, stitchbonded webs are also suitable as an intermediate forming a sheath and an adhesive tape of the invention. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

And then the Caliweb® is outstandingly suitable. The Caliweb® consists of a thermally fixed Multiknit spacer web with two outer mesh layers and an inner pile layer, which is arranged perpendicular to the mesh layers.

Also particularly advantageous is a staple fiber web which is mechanically preconsolidated in the first step or is a wet-laid web laid hydrodynamically, in which between 2% and 50% of the web fibers are fusible fibers, in particular between 5% and 40% of the fibers of the web.

A web of this kind is characterized in that the fibers are laid wet or, for example, a staple fiber web is preconsolidated by the formation of loops from fibers of the web or by needling, stitching or air-jet or water-jet treatment.

In a second step, thermofixing takes place, with the strength of the web being increased again by the (partial) melting of the fusible fibers.

The web carrier may also be consolidated without binders, by means for example of hot embossing with structured rollers, in which case pressure, temperature, dwell time, and embossing geometry can be used to control properties like strength, thickness, density, flexibility and the like.

For the inventive use of nonwovens, the adhesive consolidation of mechanically preconsolidated or wet-laid webs is of particular interest, it being possible for said consolidation to take place by way of the addition of binder in solid, liquid, foamed or pastelike form. A great diversity of theoretical embodiments is possible: for example, solid binders as powders for trickling in; as a sheet or as a mesh, or in the form of binding fibers. Liquid binders may be applied as solutions in water or organic solvent or as a dispersion. For adhesive consolidation, binder dispersions are predominantly chosen: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

Starting materials envisaged for the backings include, in particular, polyester, polypropylene, viscose or cotton fibers. The present invention is, however, not restricted to said materials; rather it is possible to use a large number of other fibers to produce the web, this being evident to the skilled worker without any need for inventive activity. Used in particular are wear-resistant polymers such as polyesters, polyolefins, polyamides or fibers of glass or of carbon.

Backings made of paper, of a laminate, of a film (for example, PP, PE, PET, PA), of foam, or of a foamed film are also suitable for wrapping the elongate product.

Suitable textile backings preferably have a basis weight of 100 to 500 g/m², recourse being had with further preference, for a good combination of abrasion resistance and insulation, to textiles having a basis mass of 150 to 300 g/m².

For the production of the adhesive tapes it is possible to have recourse to any known adhesive systems. Besides natural rubber or synthetic rubber based adhesives it is also possible to use silicone adhesives and, in particular, polyacrylate adhesives. On account of their particular suitability as an adhesive for wrapping tapes for automobile cable harnesses, with respect to the absence of fogging and also to the outstanding compatibility with PVC and PVC-free core insulation, preference is given to solvent-free acrylate hotmelts, as are described in more detail in DE 198 07 752 A1 and also in DE 100 11 788 A1. The adhesive coatweights should be adapted to the respective carriers in respect of the roughness and absorbency of the surface to be coated, and are in the range between 40 to 100 g/m² for smooth, nonabsorbent layers or else up to 300 g/m² for open, structured layers, with 50 to 150 g/m² being regarded as sufficient. Coating technologies which suggest themselves include known systems, with appropriate processes for open, absorbent textiles being those which allow adhesives of high viscosity to be applied without pressure, such as the nozzle coating of hotmelt adhesives or their application by transfer from an antiadhesive carrier cloth or release liner to the backing assembly.

Low flammability in the adhesive tapes may be achieved by adding flame retardants to the backing and/or to the adhesive. These retardants may be organobromine compounds, together where appropriate with synergists such as antimony trioxide; however, with a view to the absence of halogens from the adhesive tape, preference will be given to using red phosphorus, organophosphorus compounds, mineral compounds or intumescent compounds such as ammonium polyphosphate, alone or in conjunction with synergists.

Through an appropriate selection of the two component parts, backing and adhesive, the sheath can be varied within wide ranges. Via the nature of the backings that are used it is possible to choose abrasion resistances and temperature stabilities, insulation properties, and also color and appearance of the outer, covering ply.

Furthermore, the concept of the invention thus also embraces an elongate material, such as in particular a cable loom, wrapped according to the methods of the invention, and also a vehicle comprising the wrapped elongate material.

Surprisingly it is found that when a material is wrapped in accordance with the invention its abrasion resistance turns out to be much higher than has been known hitherto, thereby allowing a considerable increase to be achieved in the protective effect with respect to rubbing and scuffing exposures, without any need for special protective measures to be taken. With the method of the invention it is possible to produce a combination of the bandaging possibilities of a normal wrapping tape with the abrasion protection afforded by specialty systems such as TwistTubes®, braided hoses, flexible corrugated tubes, and the like.

The material wrapped in accordance with the invention is not only notable for very high abrasion resistance and scuff resistance but also has pronounced or even outstanding soundproofing properties. Specifically with cable looms in machines or automobiles it is frequently necessary to combine abrasion protection directly with antirattle requirements. A moving cable strand may on the one hand become scuffed on sharp edges and burrs, but may also generate rattling noises in the case of vibrations and counterstriking. If the wrapping method is then capable of actively suppressing or reducing the occurrence of noise, there is no need for additional, high-cost soundproofing measures.

Because of the absence of fixing of the cables by any adhesive, the cable loom wrapped in accordance with the invention is very flexible. This significantly enhances its bendability during installation—specifically, not least, in narrow passages or sharp bends.

Where the material to be ensheathed is noncylindrical, or in the event that said material differs in diameter, the advantages are manifested particularly clearly.

The installation space available within autobodies is becoming less and less. The proposed solution can be applied to cable bundles which are in flat elliptical form, and it fixes the bundled cable harness in this form, which constitutes distinct advantages in cable-harness installation.

The third adhesive tape, as an optional application aid, offers handling advantages in the processing of long bonding sections.

Finally, in relation to the known systems, ease of processing is significantly enhanced, particularly if the cable looms have a very large number of branches, which go off largely at uniform intervals from the parent loom, so that the parent loom has to be wrapped from branch to branch.

Specifically when the lines of weakness are arranged at regular intervals, sections of equal length of the wrapping material can be achieved without problems simply by pulling on the unwound material. Pulling may even take place in the axial direction, so that the sheath is separated purely by tension.

The user is able to take the sections of predetermined length from the roll of the sheath without employing any high force.

The invention is illustrated below with reference to a number of figures, without thereby wishing to subject the invention to any unnecessary restriction.

In the figures

Figure 1:
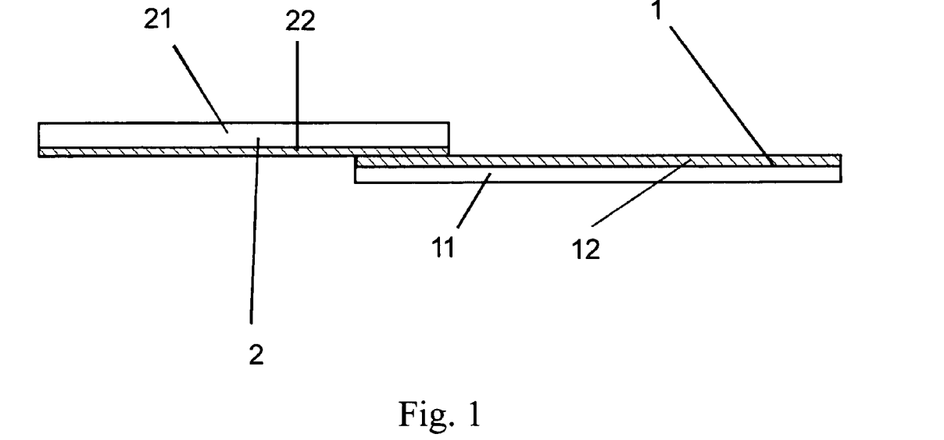
FIG. 1 shows a sheath of the invention, composed of two adhesive tapes laminated to one another.

FIG. 1 shows a sheath of the invention of the kind used for wrapping elongate material, especially cable harnesses. The sheath comprises a first and a second single-sidedly adhesive tape, 1 and 2 respectively. The adhesive tapes 1 and 2 are each composed of a backing 11, 21, on each which an adhesive 12, 22 has been applied. The adhesive tapes 1 and 2 are laminated to one another in the running direction in each case on the adhesive side with an offset. The amount of the offset is 20%.

Figure 2:
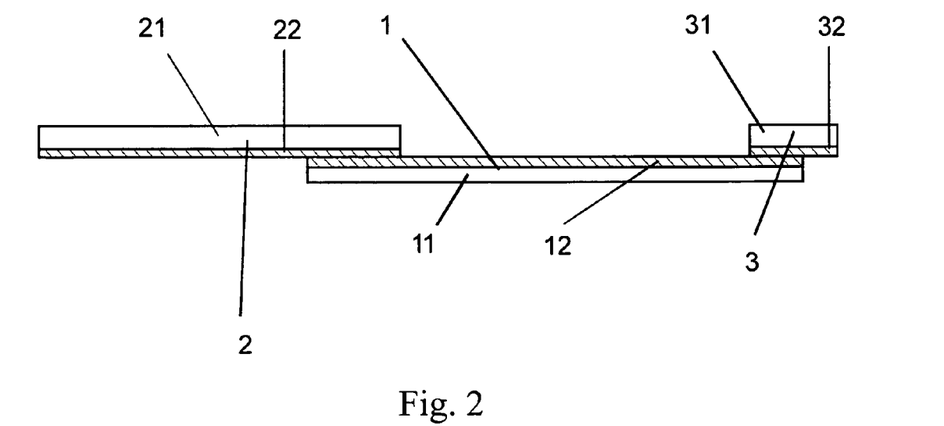
FIG. 2 shows a second sheath of the invention, composed of two adhesive tapes laminated to one another, and also a third single-sidedly adhesive tape.

FIG. 2 shows a second sheath of the invention, composed of two adhesive tapes 1 and 2 laminated to one another, and also of a third single-sidedly adhesive tape 3. At the free edge of the first adhesive tape 1 of the sheath, the third single-sidedly adhesive tape 3, composed in turn of a backing 31 and of an adhesive 32, is laminated onto the first adhesive tape 1 in the running direction in each case on the adhesive side with an offset, the third adhesive tape 3 having a smaller width than the first. The amount of the offset is 50%.

Figure 3:
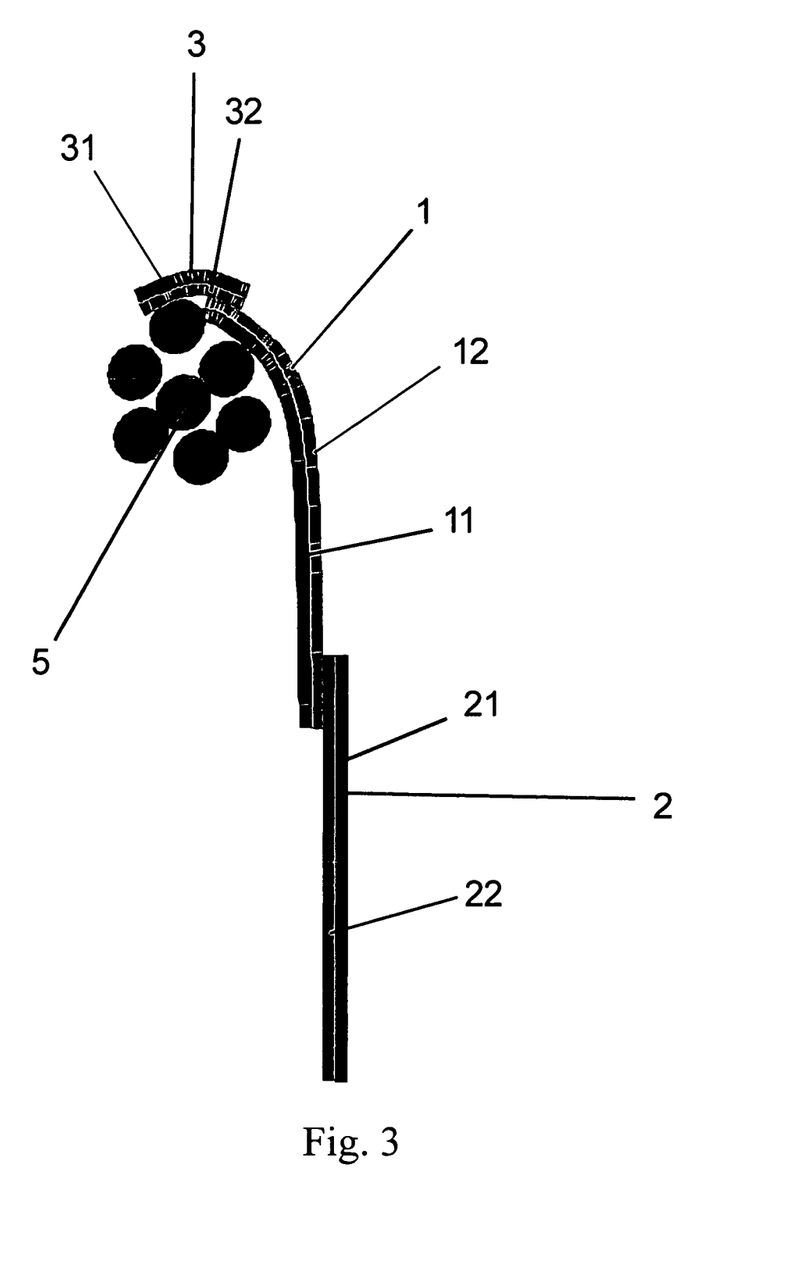
FIG. 3 shows the first step of the method of the invention for wrapping a cable loom.
Figure 4:
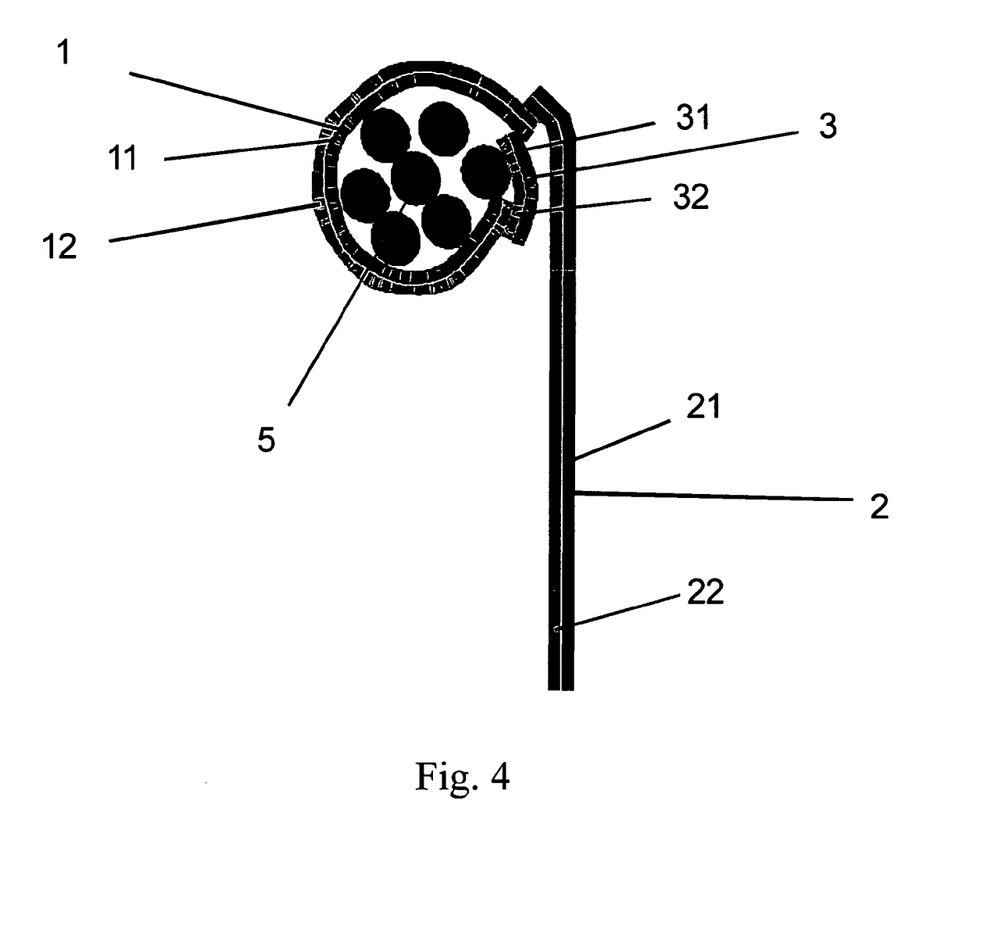
FIG. 4 shows the second step of the method of the invention for wrapping a cable loom.
Figure 5:
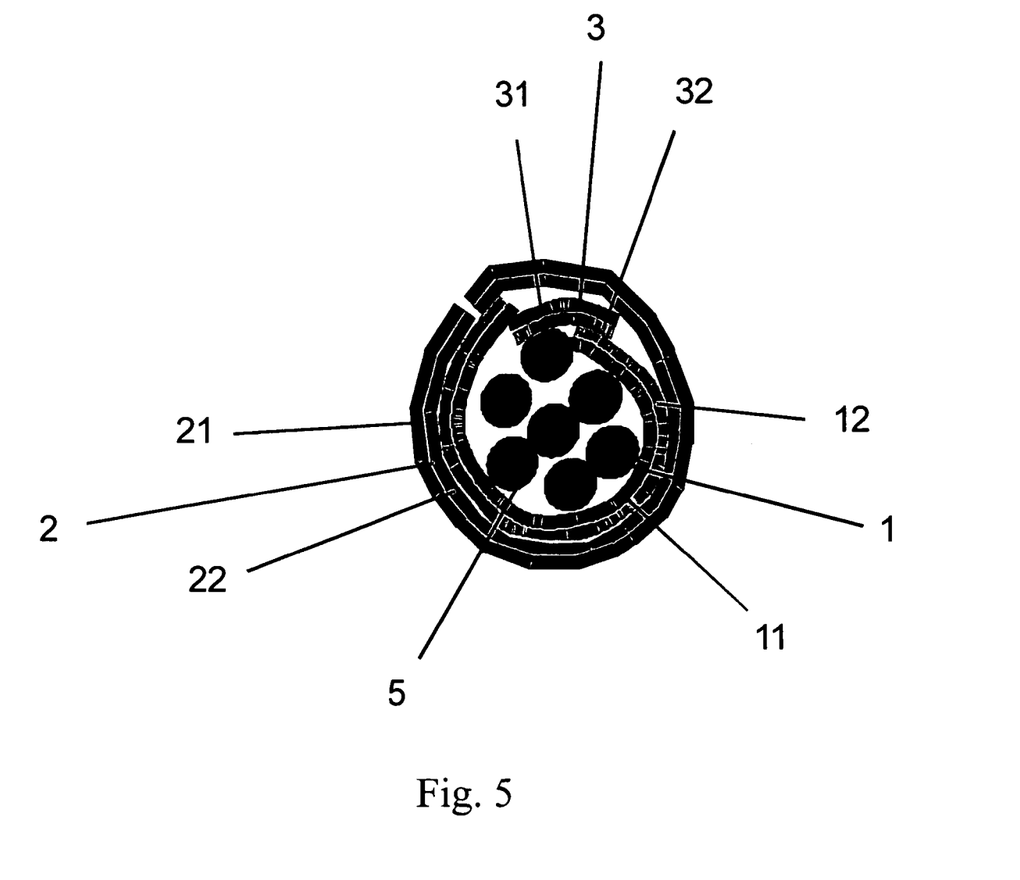
FIG. 5 shows the cable loom completely wrapped by the method of the invention.

FIGS. 3 to 5 show the method of the invention for wrapping a cable loom 5 using a sheath as depicted by FIG. 2.

As shown in FIG. 3, adhesive tape 1 has a first end, herein designated "the leading edge," depicted as directly contacting a portion of the cable loom 5 and a second end, herein designated "the trailing edge," depicted as contacting adhesive tape 2. By the same token, the end of adhesive tape 2 is designated "the leading edge" and the opposite end of adhesive tape 2 is designated "the trailing edge." The trailing edge of adhesive tape 1 is adhered to the leading edge of adhesive tape 2 with an offset creating "a lamination area."

In the first step of the method the adhesive tape 3 is fixed in the longitudinal direction of the cable loom 5. In the next step the first ply of the sheath is made by winding the first adhesive tape 1 around the cable loom 5, specifically in such a way that the nontacky side of the adhesive tape 1 lies against the cable loom 5. This maintains the flexibility of the cable loom 5. The first adhesive tape 1 of the sheath completely envelops the material 5.

The second adhesive tape 2 of the sheath is guided in a further winding around the material 5, the exposed adhesive 22 of the second adhesive tape 2 bonding to the exposed adhesive 11 of the first adhesive tape 1. At the end, the cable harness 5 is surrounded by at least two plies of adhesive tape.

The second wrapping secures the bond and ensures the double layer for increased abrasion protection.

In the table below there are typical dimensions for the widths of the adhesives tapes 1 to 3, for the width of the sheath, which is a result of the width of the adhesive tapes 1 to 3 and also of the offset, and also for the maximum diameter of the cable harness that can be ensheathed with the respective sheath.

| Total width of sheath | Width of adhesive tape 3 | Width of adhesive tapes 1 and 2 | Maximum diameter of cable harness 5 |
|---|---|---|---|
| 60  | 25 | 30  | 10 |
| 80  | 25 | 40  | 13 |
| 100 | 25 | 50  | 16 |
| 120 | 25 | 60  | 19 |
| 140 | 25 | 70  | 22 |
| 160 | 25 | 80  | 25 |
| 180 | 25 | 90  | 29 |
| 200 | 25 | 100 | 32 |
| 220 | 25 | 110 | 35 |
| 240 | 25 | 120 | 38 |
| 260 | 25 | 130 | 41 |
| 280 | 25 | 140 | 45 |
| 300 | 25 | 150 | 48 |

What is claimed is:

1. A combination comprising elongate material wrapped with a sheath;
   the elongate material having a width, a length longer than the width and a center axis parallel to the length;
   the sheath comprising first and second adhesive tapes;
   each of the first and second adhesive tapes comprising an adhesive side and a non-adhesive side;
   each of the first and second adhesive tapes having a leading edge, a trailing edge opposite said leading edge and a width;
   the leading edge and the trailing edge of each of the first and second adhesive tapes oriented essentially parallel to said center axis;
   the width of each of the first and second adhesive tapes extending perpendicular to said center axis;
   the first and second adhesive tapes being laminated to one another through their respective adhesive sides to form a laminated area of the first and second adhesive tapes that comprises the trailing edge of the first adhesive tape overlapping and laminated to the leading edge of the second adhesive tape with an offset;
   the first adhesive tape being wound around the elongate material so that the first adhesive tape essentially completely envelops the elongate material;
   the adhesive side of the first adhesive tape being farther away from the elongate material than the non-adhesive side of the first adhesive tape; and
   the second adhesive tape being wound around the elongate material and the first adhesive tape in such a way that the adhesive side of the second adhesive tape is bonded to and contacts the adhesive side of the first adhesive tape and the elongate material is always surrounded by at least two plies of adhesive tape.

2. The combination according to claim 1, wherein any exposed adhesive of the first adhesive tape is completely covered by the second adhesive tape.

3. The combination according to claim 1, wherein a third single-sided adhesive tape is laminated onto the leading edge of the first adhesive tape, in each case on the adhesive side, with an offset, the third adhesive tape having a narrower width than the first adhesive tape.

4. The combination according to claim 3, wherein the sheath and also the sheath with the third adhesive tape are present in fixed lengths.

5. The combination according to claim 1, wherein the sheath has a width of 50 to 400 mm.

6. The combination according to claim 5, wherein the sheath has a width of 80 to 280 mm.

7. The combination according to claim 3, wherein the first adhesive tape has a width of 40 to 140 mm, the second adhesive tape has a width of 40 to 140 mm and/or the third adhesive tape has a width of 20 to 40 mm.

8. The combination according to claim 1, wherein the first adhesive tape is laminated onto the second adhesive tape with an offset of 5% to 20% relative to the width of the adhesive tape.

9. The combination according to claim 3, wherein the third adhesive tape is laminated onto the first adhesive tape with an offset of 40% to 60% relative to the width of the adhesive tape.

10. The combination according to claim 3, wherein a backing material of the first, second and/or third adhesive tape is composed of a loop product or of a velour, lay, woven or formed-loop knit.

11. The combination according to claim 10, wherein the backing material is composed of a PET filament woven or a nylon woven.

12. The combination according to claim 3, wherein the adhesive of the first, second and/or third adhesive tape is a self-adhesive composition.

13. The combination according to claim 12, wherein the self-adhesive composition is a rubber or acrylate or silicone adhesive.

14. The combination according to claim 1, wherein the elongate material is a cable harness.

15. A vehicle comprising the combination according to claim 1.

16. The vehicle according to claim 15, which is an automobile.

17. The vehicle according to claim 16, wherein the elongate material is a cable harness.

* * * * *